(12) United States Patent
Herzog et al.

(10) Patent No.: US 7,177,947 B1
(45) Date of Patent: **\*Feb. 13, 2007**

(54) METHOD AND APPARATUS FOR DNS RESOLUTION

(75) Inventors: Theodore Thomas Herzog, Tustin, CA (US); Jie Chu, Los Altos, CA (US); Xi Xu, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 907 days.

This patent is subject to a terminal disclaimer.

(21) Appl. No.: 10/166,772

(22) Filed: Jun. 10, 2002

(51) Int. Cl.
*G06F 13/00* (2006.01)
(52) U.S. Cl. .......................... 709/245; 709/223; 707/7
(58) Field of Classification Search ................ 709/223, 709/203, 245; 707/7
See application file for complete search history.

(56) References Cited

U.S. PATENT DOCUMENTS

| | | | |
|---|---|---|---|
| 5,241,594 A | 8/1993 | Kung ............................. 380/4 |
| 5,570,361 A | 10/1996 | Norizuki et al. ........... 370/60.1 |
| 5,617,421 A | 4/1997 | Chin et al. ................... 370/402 |
| 5,655,077 A | 8/1997 | Jones et al. |
| 5,671,354 A | 9/1997 | Ito et al. |
| 5,684,950 A | 11/1997 | Dare et al. |
| 5,699,521 A | 12/1997 | Iizuka et al. ........... 395/200.15 |
| 5,793,763 A | 8/1998 | Mayes et al. ................ 370/389 |

(Continued)

FOREIGN PATENT DOCUMENTS

WO 99/53408 10/1999

OTHER PUBLICATIONS

Carrel, D. et al., The TACACS+Protocol, Version 1.78, Cisco Systems, Inc., printed from ftp://ftp-eng.cisco.com/gdweber/tac-rfc.1.78.txt on Oct. 23, 2000.

(Continued)

*Primary Examiner*—Kenneth R. Coulter
(74) *Attorney, Agent, or Firm*—Thelen Reid Brown Raysman & Steiner LLP

(57) ABSTRACT

A method and apparatus for resolving where to forward DNS (domain name service) requests for a user simultaneously logged into more than one service existing on a data communications network utilizes an active service list (ASL) to keep track of the services that the user is currently logged into. The active service list includes a list of services sorted in a particular order based on information about the service and sometimes the order in which the user logged into the services. Each service has a profile that defines, among other things, the IP Address space for the service and a Domain attribute. To determine the appropriate service and, therefore, the appropriate DNS server for a DNS request, the QName from the DNS request is compared to the configured Domain attribute(s) for each service in the order of the ASL. If a match is found, then the DNS request packet is modified to re-direct the DNS request to the DNS server configured for the matched service. If no domain match is found and the user is logged into an Internet Service, then the DNS request packet is modified to re-direct the DNS request to the DNS server configured for the first Internet Service found in the user's ASL. If no domain match is found and the user is not logged into an active Internet Service, then the DNS request is not re-directed, but rather forwarded unmodified.

12 Claims, 3 Drawing Sheets

U.S. PATENT DOCUMENTS

| | | | |
|---|---|---|---|
| 5,854,901 A | 12/1998 | Cole et al. | 709/245 |
| 5,884,038 A | 3/1999 | Kapoor | 709/226 |
| 5,944,824 A | 8/1999 | He | 713/201 |
| 5,959,990 A | 9/1999 | Frantz et al. | 370/392 |
| 5,974,453 A | 10/1999 | Andersen et al. | 709/220 |
| 5,983,270 A | 11/1999 | Abraham et al. | 709/224 |
| 5,991,810 A | 11/1999 | Shapiro et al. | 709/229 |
| 6,009,103 A | 12/1999 | Woundy | 370/401 |
| 6,011,910 A | 1/2000 | Chau et al. | |
| 6,021,496 A | 2/2000 | Dutcher et al. | 713/202 |
| 6,023,724 A | 2/2000 | Bhatia et al. | 709/218 |
| 6,026,441 A | 2/2000 | Ronen | 709/227 |
| 6,047,376 A | 4/2000 | Hosoe | 713/201 |
| 6,091,951 A | 7/2000 | Sturniolo et al. | 455/432 |
| 6,092,178 A | 7/2000 | Jindal et al. | 712/27 |
| 6,092,196 A | 7/2000 | Reiche | 713/200 |
| 6,119,160 A | 9/2000 | Zhang et al. | 709/224 |
| 6,130,892 A | 10/2000 | Short et al. | 370/401 |
| 6,141,687 A | 10/2000 | Blair | 709/225 |
| 6,205,489 B1 | 3/2001 | Kapoor | 709/245 |
| 6,324,585 B1 * | 11/2001 | Zhang et al. | 709/245 |
| 6,480,508 B1 * | 11/2002 | Mwikalo et al. | 370/475 |
| 6,591,306 B1 * | 7/2003 | Redlich | 709/245 |

OTHER PUBLICATIONS

Cisco Systems, Inc., "CiscoDNS/DHCP Manager V.1.1", printed from http://www.combinet.com/warp/public/751/dnsmg/dnsmg_pa.htm, on Sep. 1998, 4 pages.

Cisco Systems, Inc., "CiscoDNS/DHCP Manager V.1.1", printed from http://www.combinet.com/warp/public/751/dnsmg/dnsmg_pa.htm, on Sep. 1998, 7 pages.

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

Cisco Systems, Inc., "Cisco DNS/DHCP Manager", printed from http://mwrns.noaa.gov/cisco/cc/td/doc/resprdct/ress31/html, on Sep. 10, 1998, 4 pages.

Network Registrar, "Hot Products & Solutions", American Internet Corporation, printed form http://www.american.com/networkregistrar, html, on Jul. 24, 1998.

"Three Ways to Manage IP Addresses", PC Magazine: IP Address Management, printed from http://www.zdnet.com/pcmag/features/ipmanage/ip-s2.htm, on Sep. 10, 1998.

* cited by examiner

| Byte 0 | Byte 1 | Byte 2 | Byte 3 |
|---|---|---|---|
| 4-bit version / 4-bit hd len | TOS value | 13-len (in bytes) | |
| 16-bit identification | | 3-bit flags | 13-bit fragmentation offset |
| TTL | prot_typ | .csum | |
| Source IP address 12 | | | |
| Dest IP address 14 | | | |
| Options (if any) | | | |
| Source port number | | Dest port number 10 | |
| 32 bit sequence number | | | |
| 32 bit acknowledge number | | | |
| 4-bit hll | Reserved (6 bits) / urg ack psh rst syn fin | 16 bit window size | |
| 16 bit TCP checksum | | 16 bit urgent pointer | |

TCP/UDP only (from Source port number row down)
TCP only (from 32 bit sequence number down)

FIG. 1

METHOD AND APPARATUS FOR DNS RESOLUTION

CROSS-REFERENCE TO RELATED APPLICATION

This application claims priority based on parent application Ser. No. 09/235,940, entitled "Method and Apparatus For DNS Resolution" by inventors Theodore Herzog, Jie Chu and Xi Xu, filed on date Jan. 22, 1999.

BACKGROUND OF THE INVENTION

1. Field of the Invention

The present invention relates to the field of data communications networks. More particularly, this invention relates to a method and apparatus for resolving Domain Name Service requests in a data communications network.

2. The Background

The Service Selection Gateway (SSG) is a product which allows data communications network users to select and login to services available on the data communications network. These services can include computer intranets, pay per use sites, the Internet, community of interest services and the like. The SSG permits a user to simultaneously log in to a plurality of such services, even if they have overlapping IP address space.

Each service to which a user may be connected has an associated IP (Internet Protocol) address space. That is, a certain range of addresses may address that space. The range may be contiguous, discontiguous, or a combination of both. For example, Corp A may have an intranet service having all IP addresses which start with "10.1"—this may be denoted "10.1.x.x" where x can be any value. It may also be denoted "10.1.0.0; 255.255.0.0" where "10.1.0.0" represents the IP address and "255.255.0.0" represents the subnet mask. Those of skill in the art will recognize that a 255 in the subnet mask field represents a binary 1111 1111 and amounts to a requirement that the corresponding field of the IP address must match bit for bit in order to achieve a match. On the other hand, a 0 in the subnet mask field represents a binary 0000 0000 and amounts to no requirement for any match. For example, a service having an address space of "0.0.0.0; 0.0.0.0" represents the Internet, i.e., all IP addresses are within this space. Note that since the subnet mask is 0.0.0.0 the IP address could be set to any value and it would yield the same result.

In data communications networks a domain name service (DNS) is used to resolve textual domain name strings, such as "CORPA.COM", into numerical IP addresses which can be used to route packets to and from such domains. A DNS system typically includes a hierarchy of DNS servers distributed throughout the network. A DNS request is generated, for example, by a user running an Internet browser application program on a computer. The DNS request is then forwarded to a DNS server associated with the user's account as often determined by settings set in software (typically the user's operating system) by the user. If the DNS request can be handled at that level, the numerical IP address is passed back to the user's application. If not, the request is passed to a superior DNS service, and so on.

Where the user is logged into more than one service, more than one DNS service may be available to service the user's DNS requests. This leads to a conflict. In some cases one of the DNS services will be "better" to use than another in that it may be more likely to quickly resolve the DNS request, however, the settings in the user's operating system may undesirably direct the DNS request packet to the "wrong" DNS service. Accordingly, it would be desirable to provide a method and apparatus for resolving where to forward DNS requests from a user with more than one concurrent service connection on a data communications network.

SUMMARY OF THE INVENTION

A method and apparatus for resolving where to forward DNS (domain name service) requests for a user simultaneously logged into more than one service existing on a data communications network utilizes an active service list (ASL) to keep track of the services that the user is currently logged into. The active service list includes a list of services sorted in a particular order based on information about the service and sometimes the order in which the user logged into the services. Each service has a profile that defines, among other things, the IP Address space for the service and a Domain attribute. To determine the appropriate service and, therefore, the appropriate DNS server for a DNS request, the QName from the DNS request is compared to the configured Domain attribute(s) for each service in the order of the ASL. If a match is found, then the DNS request packet is modified to re-direct the DNS request to the DNS server configured for the matched service. If no domain match is found and the user is logged into an Internet Service, then the DNS request packet is modified to re-direct the DNS request to the DNS server configured for the first Internet Service found in the user's ASL. If no domain match is found and the user is not logged into an active Internet Service, then the DNS request is not re-directed, but rather forwarded unmodified.

BRIEF DESCRIPTION OF THE DRAWINGS

FIG. 1 is a diagram of an IP version 4 packet header.

DETAILED DESCRIPTION OF THE PREFERRED EMBODIMENTS

Figure 2:
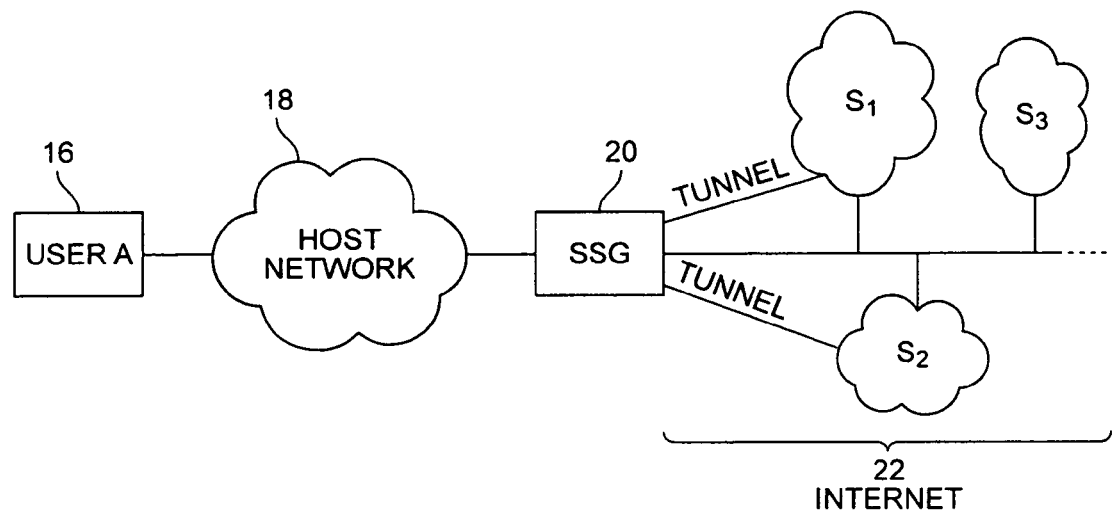
FIG. 2 is a system block diagram of a typical data communications network.

Those of ordinary skill in the art will realize that the following description of the present invention is illustrative only and not in any way limiting. Other embodiments of the invention will readily suggest themselves to such skilled persons after a perusal of the within disclosure.

In accordance with a presently preferred embodiment of the present invention, the components, processes and/or data structures are implemented using a gateway device and other services implemented using C++ programs running on IBM compatible personal computer device running Vx Works available from Wind River Systems of Alameda, Calif. as its operating system. Different implementations may be used and may include other types of operating systems, computing platforms, computer programs, firmware and/or general purpose machines. In addition, those of ordinary skill in the art will readily recognize that devices of a less general purpose nature, such as hardwired devices, devices relying on FPGA (field programmable gate array) or ASIC (Application Specific Integrated Circuit) technology, or the like, may also be used without departing from the scope and spirit of the inventive concepts disclosed herein.

The service selection gateway (SSG or gateway) is a device which couples the user via a network access server (NAS) or other conventional means to the data communications network. The term gateway is not meant to be limited to a single type of device, as any device, hardware or software, that may act as a bridge between the user and the network may be considered a gateway for the purposes of this application. In accordance with a presently preferred embodiment of the present invention, the SSG is a device available from Cisco Systems, Inc. of San Jose, Calif.

FIG. 1 is a diagram of an IP version 4 (IP) packet header. A DNS request packet is an IP packet having an IP header where the Layer 4 destination port number 10 is set to 53 decimal. Any value could be used, but by the standards presently in use 53 is the designator for a DNS request packet. Typically an application program running on the user's computer will generate the DNS request packet in response to encountering a textual domain name such as "CORPA.COM". The user's application program will set the Source IP address field 12 to the user's IP address (which may be dynamically assigned as well known to those of ordinary skill in the art) and will set the destination IP address 14 to that of the DNS server that the user's operating system is configured to use.

Those of ordinary skill in the art will recognize that this invention will work with packet transmission protocols other than IP version 4 and that IP version 4 is merely used as an example herein.

FIG. 2 is a diagram of a typical network configuration where a user utilizes an SSG or its equivalent to obtain simultaneous access to more than one service. User A 16 is connected to a host network 18. The connection may be by telephone into a network access server (NAS) or by local area network connection or by other connecting means known to those of skill in the art.

The host network 18 is connected to the SSG 20. The SSG, in turn, is connected to a larger data communications network 22 such as the Internet having a plurality of services $S_1$, $S_2$ and $S_3$ associated with it. SSG 20 preferably creates tunneling connections such as Layer 2 tunneling protocol (L2TP) connections with services $S_1$, $S_2$ and $S_3$ as required by users.

SSG 20 maintains a database of "host objects" for each user. For example, User A (16) has a host object in or associated with SSG 20 which preferably includes a service list containing a list of services to which user A is subscribed and an Active Service List (ASL) containing a list of services to which User A is currently connected or logged into. SSG 20 also preferably maintains in memory a service object for each active service. Each entry in the active service list is a pointer to a service object.

Figure 3A:
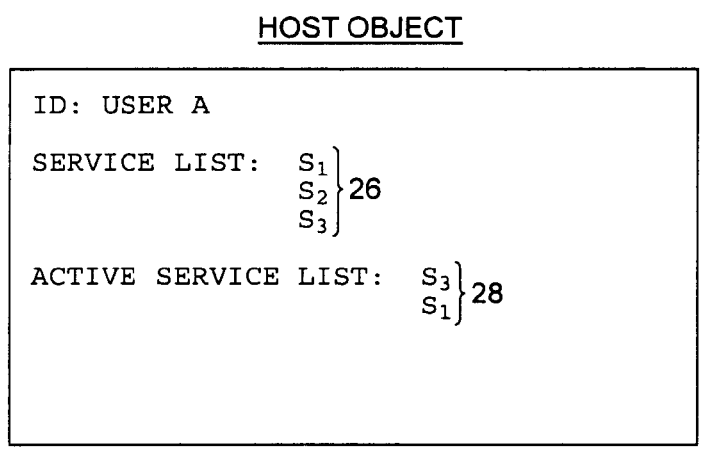
FIG. 3A is a diagram illustrating a host object in accordance with a presently preferred embodiment of the present invention

FIG. 3 is a diagram showing the organization of a host object 24 associated with User A (16). The host object contains a list of services to which User A is subscribed 26. The service list 26 preferably contains only pointers to the service objects corresponding to the services to which the user is subscribed.

The host object also contains an ASL 28 which preferably contains only pointers to the service objects corresponding to the active services to which User A is logged in.

Figure 3B:
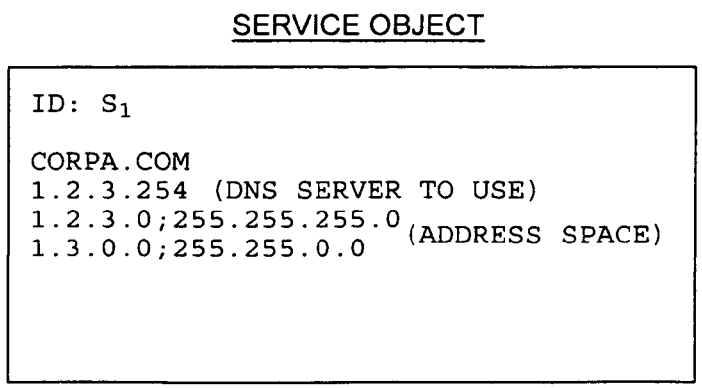
FIG. 3B is a diagram illustrating a service object in accordance with a presently preferred embodiment of the present invention.

A service object, as diagrammed in FIG. 3B, preferably contains an identification value, one or more domain name strings, corresponding IP address space, typically denoted with an IP address and subnet mask. The address range may consist of a single address and subnet mask, i.e., 1.2.0.0; 255.255.0.0, multiple address ranges and subnet masks, and/or an internet service identification, e.g., 0.0.0.0; 0.0.0.0. Also included are at least one DNS service address to use with the service. This is a minimum; other information could be contained as desired in the service object.

Where a user is logged into multiple services, such as an Internet Service Provider (ISP) and an intranet, the user may have DNS requests which are better resolved by the DNS service associated with the ISP and other DNS requests which are better resolved by the DNS service associated with the intranet. For example, if the User A wants to contact a domain having a domain name string of "WWW.CORPA.COM" it will generally be better to direct the DNS request packet to the DNS server associated with CORPA.COM rather than some other DNS server.

In accordance with the invention, the ASL 28 is sorted based upon the number of potential IP addresses associated with each entry. First, the "largest" address range entry is selected for each entry. The "size" is determined by the subnet mask of the corresponding service found in its service object. A subnet mask of 255.255.255.255 is associated with a single IP address. A subnet mask of 0.0.0.0 is associated with every IP address. A number of subnet masks exists between those two extremes. For example, if an entry in the ASL is $S_3$ and its service object includes:

CORPA.COM, 1.2.3.254 (DNS server to use), 1.2.3.0; 255.255.255.0, 1.3.0.0; 255.255.0.0 then the "largest" address range is the second one, i.e., 1.3.0.0; 255.255.0.0.

If the other entry in the ASL is $S_1$ and its service object shows:

ISP.NET, 1.99.88.254 (DNS server to use), 1.99.88.2; 255.255.255.255, 1.98.88.0; 255.255.255.0, 0.0.0.0; 0.0.0.0 then the "largest" address range is the third one, 0.0.0.0; 0.0.0.0 corresponding to full Internet Access. (Realistically, however, most Internet Services would be configured only with the address range 0.0.0.0;0.0.0.0—this is an example only).

Since the "ISP.NET" entry is "larger" than the "CORPA.COM" entry, it goes last in the ASL after sorting so that the "smaller" entries are checked first.

Now, when a DNS request packet is generated by USER A (16) and received by SSG 20, the ASL is checked to determine how to proceed.

First, the domain name associated with the request packet (the QName) is compared to the domain names of the service objects pointed to by the entries in the ASL 28. If a match, e.g., "CORPA.COM", is found, then the DNS request packet is modified so that the IP address of the DNS service associated with the match is inserted for the IP destination address of the DNS request packet. This forces the DNS request packet to be routed to the selected DNS service rather than, for example, the default DNS service selected by the user when configuring his or her operating system.

If no match is found with a domain name in the service objects pointed to by the entries in the ASL 28 but the user is logged into an Internet Service (in this example, $S_1$), then the DNS request packet is modified so that the IP address of the DNS service associated with the Internet Service is inserted for the IP destination address of the DNS request packet This forces the DNS request packet to be routed to the selected DNS service rather than, for example, to the default DNS service selected by the user when configuring his or her operating system.

Finally, if no domain name match exists and the user is not logged into an Internet Service, then the packet is passed without modification to the original IP destination address in the DNS request packet which is whatever default DNS service the user has selected.

Figure 4:
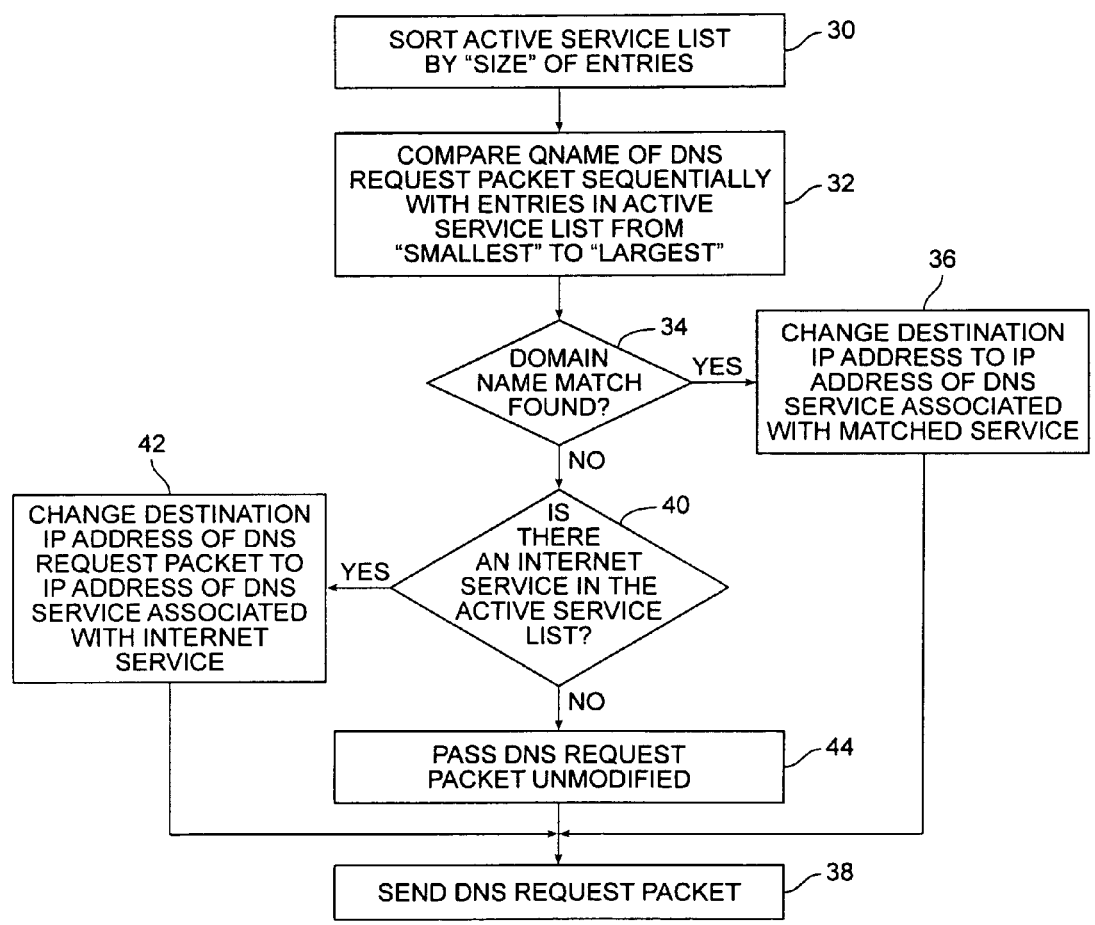
FIG. 4 is a flow chart of a method for resolving DNS service requests in accordance with a presently preferred embodiment of the present invention.

Turning now to FIG. 4, a flow chart of method for resolving where to send DNS request packets in accordance with a presently preferred embodiment of the present invention is shown.

At reference numeral 30 the Active Service List is sorted by the "size" of the largest address range entries. One way to do this is by counting the binary "1"s in the subnet mask of the corresponding service objects, with masks having a fewer number of "1" s having a "larger" "size".

At reference numeral 32 the domain name string, e.g., "CORPA.COM", is extracted from the DNS request packet (identified by its Layer 4 destination port number) in a conventional manner. It is then compared sequentially with the entries in the Active Service List from "smallest" to "largest".

At reference number 34 if a domain name match is found, then control transfers to reference numeral 36 where the destination IP address of the DNS request packet is changed to the DNS Service IP address indicated for the matched service. Control then transfers to reference numeral 38 where the packet is transmitted. If no match is found, control transfers to reference numeral 40 where the Active Service List is checked for an Internet Service entry, i.e., one with a subnet mask of 0.0.0.0. If one is found, control transfers to reference numeral 42 where the destination IP address of the DNS request packet is changed to the DNS service IP address indicated for that service. Control then transfers to reference numeral 38 where the packet is transmitted.

If no domain name match is found and the user is not logged into an Internet Service, then the packet is left unmodified at reference numeral 44, and is transmitted at reference numeral 38.

ALTERNATIVE EMBODIMENTS

While embodiments and applications of the invention have been shown and described, it would be apparent to those of ordinary skill in the art, after a perusal of the within disclosure, that many more modifications than mentioned above are possible without departing from the inventive concepts herein. The invention, therefore, is not to be restricted except in the spirit of the appended claims.

What is claimed is:

1. A method for intercepting DNS request packets from a user and directing said packets to one of a plurality of DNS services, each of the DNS request packets having a requested domain name, the method comprising:
   storing an active list of services to which the user is currently logged in, each service in said active list being associated with a domain name, a DNS service address to be used for the service, and at least one address range corresponding to the service;
   sorting entries in said active list based upon a number of potential IP addresses associated with each entry;
   modifying a destination IP address of a packet to match an address corresponding to a proper DNS server, said proper DNS server chosen from said domain name service addresses associated with said at least one service.

2. The method of claim 1, further comprising: abstaining from modifying the destination IP address if the requested domain name does not match any of said stored domain names.

3. The method of claim 1, further comprising: receiving a reply from said proper DNS server; and forwarding said reply to a source IP address of a DNS packet.

4. A method for intercepting DNS request packets from a user and directing said packets to one of a plurality of DNS services, said method comprising:
   storing an active list of services to which the user is currently logged in, each service in said active list being associated with a domain name, a DNS service address to be used for the service, and at least one address range including a subnet mask corresponding to the service;
   sorting entries in said active list based upon a number of potential IP addresses associated with each entry;
   modifying a destination address of a DNS request packet by changing said destination address of the packet to a DNS service address corresponding to a match between a QName in the DNS request packet and a domain name associated with one of the services, or in the absence of such a match, to a DNS service address corresponding to an Internet Service if one of the services is an Internet Service.

5. The method of claim 4, further comprising: receiving a reply from said proper DNS server; and forwarding said reply to a source IP address of a DNS packet.

6. An apparatus for intercepting DNS request packets from a user and directing said packets to one of a plurality of DNS services, each of the DNS request packets having a requested domain name, the apparatus comprising:
   means for storing an active list of services to which the user is currently logged in, each service in said active list being associated with a domain name, a DNS service address to be used for the service, and at least one address range corresponding to the service;
   means for sorting entries in said active list based upon a number of potential IP addresses associated with each entry; and
   means for modifying a destination IP address of a packet to match an address corresponding to a proper DNS server, said proper DNS server chosen from said domain name service addresses associated with said at least one service.

7. The apparatus of claim 6, further comprising means for abstaining from modifying the destination IP address if the requested domain name does not match any of said stored domain names.

8. The apparatus of claim 6, further comprising:
   means for receiving a reply from said proper DNS server; and
   means for forwarding said reply to a source IP address of a DNS packet.

9. An apparatus for intercepting DNS request packets from a user and directing said packets to one of a plurality of DNS services, said apparatus comprising:
   means for storing an active list of services to which the user is currently logged in, each service in said active list being associated with a domain name, a DNS service address to be used for the service, and at least one address range including a subnet mask corresponding to the service;
   means for sorting entries in said active list based upon a number of potential IP addresses associated with each entry; and means for modifying a destination address of a DNS request packet by changing said destination address of the packet to a DNS service address corresponding to a match between a QName in the DNS request packet and a domain name associated with one of the services, or in the absence of such a match, to a DNS service address corresponding to an Internet Service if one of the services is an Internet Service.

10. The apparatus of claim 9, further comprising: means for receiving a reply from said proper DNS server; and means for forwarding said reply to a source IP address of a DNS packet.

11. A program storage device readable by a machine, tangibly embodying a program of instructions embodied in computer-readable media and executable by the machine to perform a method for intercepting DNS request packets from a user and directing said packets to one of a plurality of DNS services, each of the DNS request packets having a requested domain name, the method comprising:

storing an active list of services to which the user is currently logged in, each service in said active list being associated with a domain name, a DNS service address to be used for the service, and at least one address range corresponding to the service;

sorting entries in said active list based upon a number of potential IP addresses associated with each entry; and modifying a destination IP address of a packet to match an address corresponding to a proper DNS server, said proper DNS server chosen from said domain name service addresses associated with said at least one service.

12. A program storage device readable by a machine, tangibly embodying a program of instructions embodied in computer-readable media and executable by the machine to perform a method for intercepting DNS request packets from a user and directing said packets to one of a plurality of DNS services, said method comprising:

storing an active list of services to which the user is currently logged in, each service in said active list being associated with a domain name, a DNS service address to be used for the service, and at least one address range including a subnet mask corresponding to the service;

sorting entries in said active list based upon a number of potential IP addresses associated with each entry; and modifying a destination address of a DNS request packet by changing said destination address of the packet to a DNS service address corresponding to a match between a QName in the DNS request packet and a domain name associated with one of the services, or in the absence of such a match, to a DNS service address corresponding to an Internet Service if one of the services is an Internet Service.

* * * * *

UNITED STATES PATENT AND TRADEMARK OFFICE
CERTIFICATE OF CORRECTION

| | |
|---|---|
| PATENT NO. | : 7,177,947 B1 |
| APPLICATION NO. | : 10/166772 |
| DATED | : February 13, 2007 |
| INVENTOR(S) | : Herzog et al. |

Page 1 of 1

It is certified that error appears in the above-identified patent and that said Letters Patent is hereby corrected as shown below:

On Title page
After item (22) please insert:

Related U.S. Application Data

Item (63) Continuation of application No. 09/235,940, filed on Jan. 22, 1999, now Pat. No. 6,425,003.

Signed and Sealed this

First Day of May, 2007

JON W. DUDAS
*Director of the United States Patent and Trademark Office*